C. C. HARBRIDGE.
DEMOUNTABLE RIM.
APPLICATION FILED MAY 3, 1915.

1,250,309.

Patented Dec. 18, 1917.

Witnesses:
John Enders
Mildred Stumpf

Inventor:
Chester C. Harbridge
by Fred Gerlach
his Atty.

UNITED STATES PATENT OFFICE.

CHESTER C. HARBRIDGE, OF DETROIT, MICHIGAN, ASSIGNOR OF ONE-HALF TO DETROIT DEMOUNTABLE RIM CO., OF DETROIT, MICHIGAN, A CORPORATION OF MICHIGAN, AND ONE-HALF TO JACKSON RIM COMPANY, OF JACKSON, MICHIGAN, A CORPORATION OF MICHIGAN.

DEMOUNTABLE RIM.

1,250,309.  Specification of Letters Patent.  Patented Dec. 18, 1917.

Application filed May 3, 1915. Serial No. 25,383.

*To all whom it may concern:*

Be it known that I, CHESTER C. HARBRIDGE, a resident of Detroit, in the county of Wayne and State of Michigan, have invented certain new and useful Improvements in Demountable Rims, of which the following is a full, clear, and exact description.

The invention relates to demountable rims for pneumatic tires.

In the practice of the invention set forth, in Letters Patent No. 1,067,982, it has been found that when the rim is split by a diagonal cut and particularly if there is a slight play or looseness in the locking device and the tire fits tightly in the rim or before the locking device is in place, so as to exert a pressure tending to contract the rim, the contiguous inclined ends would slide upon each other, as a result of the pressure of the tire upon the rim, and force the rim-ends out of alinement, thus causing the tire-holding flanges to cut into the tire, and preventing easy operation of the rim-lock.

The present invention is designed to overcome this objection to the use of a rim with a diagonal, transverse cut, and this object is attained by extending the diagonal cut partly across the rim and forming the remainder of the cut, so that the end-portions of the rim will abut against each other in such manner that the contracting pressure of the tire will be limited and will not exert pressure which will force the rim-ends out of alinement.

The invention consists in the several novel features hereinafter set forth and more particularly defined by claims at the conclusion hereof.

Figure 1:
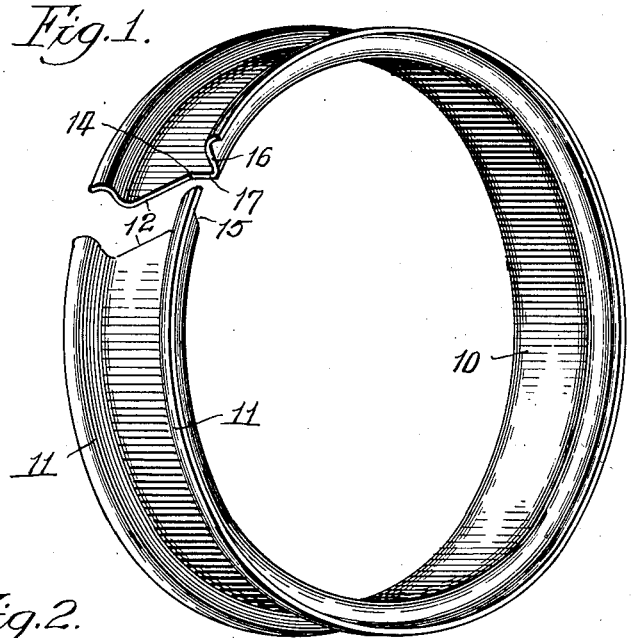
Figure 2:
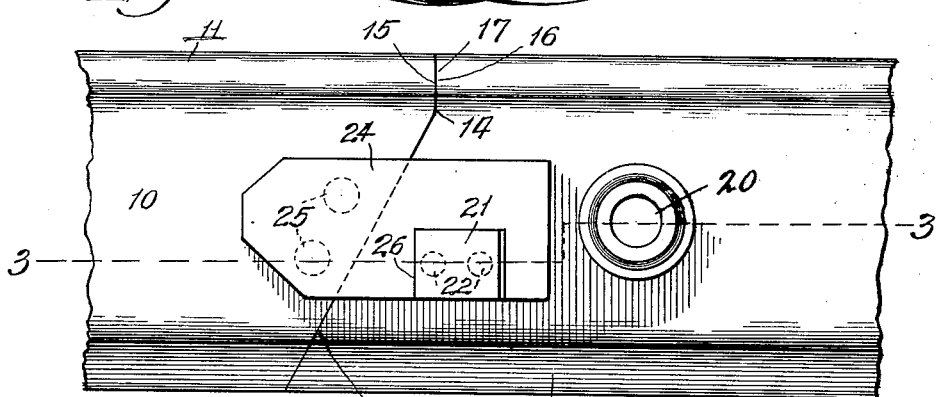
Figure 3:
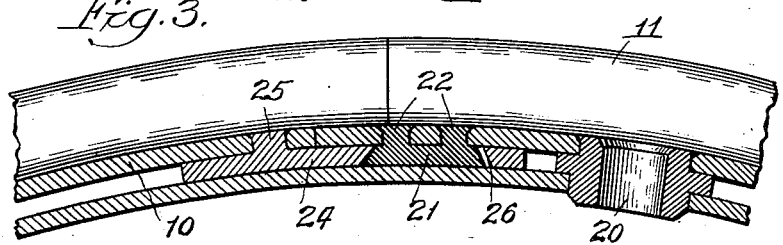

In the drawings: Figure 1 is a perspective of a demountable rim embodying the invention. Fig. 2 is an inner face view of a portion of the rim and Fig. 3 is a section taken on line 3—3 of Fig. 2.

The improved rim consists of a band 10, adapted to fit around a wheel-body and to be secured thereon, usually by wedges and bolts, as well understood in the art. This band is provided with integral tire-engaging flanges 11 which may be formed to fit any of the well known forms of pneumatic tires. To facilitate placement of the rim within the tire and removal therefrom, the rim is transversely split at one point to permit inward and lateral flexing of one end of the rim away from the tire and this split is formed by a diagonal cut 12 to facilitate the lateral springing or distortion of one of the rim-ends relatively to or away from the other. In lieu of extending the diagonal split transversely across the entire rim, it is extended partly across to a point 14 and thence the cut extends substantially at a right angle to the side of the rim, as at 17, forming, in effect, an obtuse angled, transverse split in the rim. To avoid contraction of the rim by the tire which would cause one end to slide within the other, as is possible when the ends are undercut, the entire split is cut on a substantially radial line.

As a result of this peculiar contour of the split, the abutting end-portions 15 and 16, where the cut is radial and at right angles to the side of the rim, will act to positively limit the contraction of the rim by the tire and when these abutting portions are in engagement with each other further contraction by the tire will not occur. As a result of this peculiar form of split, the contracting pressure of the tire will be positively limited, so that the pressure of the edges of the rim-ends against each other will not be effective to force the rim-ends out of alinement with each other, either laterally or radially. Furthermore, a decided incline may be used on the rim-ends to facilitate distortion without the objectionable sliding between the abutting rim-ends.

An opening 20 is formed adjacent one end of the rim for the tire-valve.

The ends of the rim are locked together by means of a plate 21 which is secured to the inner face of the end of the rim in which the tire-valve is secured, by rivets 22 and a plate 24 which is secured to the inner face of the other rim-end by rivets 25 and is provided with a rectangular opening 26 in one of its sides for receiving plate 21. This rim-lock serves to secure the rim-ends together. Since this locking device is not claimed in the present application, it is not deemed necessary to describe its operation in detail.

The invention thus exemplifies an improved transversely split rim which has a diagonal split extending partly across the rim and a right-angled cut across the remaining portion, whereby contracting pressure of the tire upon the rim will be limited to prevent the abutting angularly cut contiguous edges of the rim ends from sliding on each other.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An integrally flanged demountable tire rim, having a transverse split or cut extending diagonally inward and substantially straight from one side through a portion of the rim and through the remaining portion thereof at substantially right angles to the side of the rim to positively limit the diagonally cut end-portions from sliding on each other.

2. A demountable tire-rim having integral side-flanges and a transverse split or cut extending diagonally from one side and through one of the side-flanges and substantially straight to a point adjacent the other flange and through the latter flange at substantially a right angle to the side of the rim to positively limit the contraction of the rim by pressure of the tire and to prevent the diagonally cut portions from sliding transversely on each other.

CHESTER C. HARBRIDGE.

Witnesses:
  A. H. Goss,
  Florence Jacobi.